United States Patent
Burke

(10) Patent No.: US 6,423,114 B1
(45) Date of Patent: Jul. 23, 2002

(54) PRESSURE CONTROL

(75) Inventor: Peter Damian Burke, Winthrop (AU)

(73) Assignee: Technological Resources Pty. Ltd., Melbourne (AU)

( * ) Notice: Subject to any disclaimer, the term of this patent is extended or adjusted under 35 U.S.C. 154(b) by 0 days.

(21) Appl. No.: 09/634,059

(22) Filed: Aug. 9, 2000

(30) Foreign Application Priority Data

Aug. 10, 1999 (AU) .............................................. PQ 2130

(51) Int. Cl.[7] .......................... C21B 15/00; C22B 7/072; C22B 7/076
(52) U.S. Cl. ............................. 75/378; 75/582; 75/584
(58) Field of Search ........................... 75/378, 584, 582

(56) References Cited

U.S. PATENT DOCUMENTS

| | | |
|---|---|---|
| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zang |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,482 A | 2/1986 | Bedell |
| 4,574,714 A | 3/1986 | Bach et al. |
| 4,602,574 A | 7/1986 | Bach et al. |
| 4,664,618 A | 5/1987 | Gitman |

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |

(List continued on next page.)

OTHER PUBLICATIONS

Derwent Acc. No. 1981–95028D, Elliott, R.P. abstract from ZA 8005527 A, published Jul. 24, 1981.*

U.S. application No. 09/550,421, Dry, filed Apr. 17, 2000.

U.S. application No. 09/160,913, Dry, filed Sep. 25, 1998.

(List continued on next page.)

*Primary Examiner*—Roy King
*Assistant Examiner*—Tima McGuthry-Banks
(74) *Attorney, Agent, or Firm*—Merchant & Gould, P.C.

(57) ABSTRACT

A direct smelting process for producing molten iron and/or ferroalloys from a metalliferous feed material is disclosed. The process is a molten bath based process that is carried out in a direct smelting vessel. The process includes the steps of supplying metalliferous feed material, carbonaceous material and fluxes into the vessel; smelting metalliferous feed material to molten iron in the molten bath; and injecting an oxygen-containing gas into the vessel to post-combust gases generated in the process. The process is characterised by controlling the level of molten metal in the vessel by adjusting the pressure in the vessel.

21 Claims, 3 Drawing Sheets

U.S. PATENT DOCUMENTS

| | | |
|---|---|---|
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,804,408 A | 2/1989 | Puhringer |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,630,862 A | 5/1997 | Greenwalt |
| 5,640,708 A | 6/1997 | Conochie et al. |
| 5,647,888 A | 7/1997 | Keogh et al. |
| 5,683,489 A | 11/1997 | Hayashi et al. |
| 5,741,349 A | 4/1998 | Hubble et al. |
| 5,800,592 A | 9/1998 | den Hartog et al. |
| 5,802,097 A | 9/1998 | Gensini et al. |
| 5,869,018 A | 2/1999 | Stephens, Jr. |
| 5,871,560 A | 2/1999 | Fluch et al. |
| 5,938,815 A | 8/1999 | Satchell, Jr. |
| B14,940,488 A | 8/1999 | Maeda et al. |
| 6,083,296 A * | 7/2000 | Innes et al. ............... 75/502 |

FOREIGN PATENT DOCUMENTS

| | | |
|---|---|---|
| AU | B-26831/88 | 7/1989 |
| AU | B-28802/89 | 8/1989 |
| AU | A-42859/89 | 4/1990 |
| AU | A-49039.90 | 9/1990 |
| AU | A-49307/90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| JP | 56096006 A * | 8/1981 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |
| WO | WO 0012766 A * | 8/1999 ........... C21B/11/10 |

OTHER PUBLICATIONS

U.S. application No. 09/331,277, Jai, filed Jun. 17, 1999.
U.S. application No. 09/331,272, Bates, filed Jun. 17, 1999.
U.S. application No. 09/509,314, Bates, filed Mar. 21, 2000.
U.S. application No. 09/535,665, Leigh, filed Mar. 21, 2000.
U.S. application No. 09/462,282, McCarthy, filed Mar. 16, 2000.
U.S. application No. 09/478,750, Dry, filed Jan. 6, 2000.
U.S. application No. 09/509,286, MCarthy, filed Mar. 21, 2000.
U.S. application No. 09/509,264, Dry, filed Mar. 21, 2000.
U.S. application No. 09/509,290, Dry, filed Mar. 21, 2000.
U.S. application No. 09/509,323, Dry, filed Mar. 21, 2000.
U.S. application No. 09/587,774, Bates, filed Jun. 6, 2000.
U.S. application No. 09/611,514, Bates, filed Jul. 7, 2000.
U.S. application No. 09/632,730, Dry, filed Aug. 4, 2000.
U.S. application No. 09/669,397, Batterham, filed Sep. 26, 2000.
U.S. application No. 09/685,488, Burke, filed Oct. 10, 2000.
U.S. application No. 09/692,821, Dry, filed Oct. 12, 2000.
Patent Abstract of Japan, JP, A, 10–280020 (Nippon Steel Corp), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.
WPAT print–out for Brazilian patent application P19400123–5 (Weber) No Month 1995.
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K), Dec. 15, 1987.
Derwent Abstract Accession No.87–039748/06 Class Q77, JP, A, 61–295334, Dec. 26, 1986.
International Search Report PCT/AU00/00938 No Month 2000.

* cited by examiner

PRESSURE CONTROL

The present invention relates to a process for producing molten iron and/or ferroalloys from a metalliferous feed material, such as ores, partly reduced ores, and metal-containing waste streams, in a metallurgical vessel containing a molten bath.

The present invention relates particularly to a molten bath-based direct smelting process for producing molten iron and/or ferroalloys from a metalliferous feed material.

The term "direct smelting process" is understood to mean a process that produces a molten metal (which term includes alloys), in this case iron and/or ferroalloys, from a metalliferous feed material.

The present invention relates more particularly to a molten bath-based direct smelting process which relies on a molten metal layer as a smelting medium and is generally referred to as the HIsmelt process.

In general terms, the HIsmelt process includes the steps of:

(a) forming a molten bath having a metal layer and a slag layer on the metal layer in a direct smelting vessel;

(b) injecting metalliferous feed material and solid carbonaceous material into the metal layer via a plurality of lances/tuyeres;

(c) smelting metalliferous feed material to metal in the metal layer;

(d) causing molten material to be projected as splashes, droplets, and streams into a space above a nominal quiescent surface of the molten bath to form a transition zone; and (e) injecting an oxygen-containing gas into the vessel via one or more than one lance/tuyere to post-combust reaction gases released from the molten bath, whereby the ascending and thereafter descending splashes, droplets and streams of molten material in the transition zone facilitate heat transfer to the molten bath, and whereby the transition zone minimises heat loss from the vessel via the side walls in contact with the transition zone.

A preferred form of the HIsmelt process is characterized by forming the transition zone by injecting carrier gas, metalliferous feed material, solid carbonaceous material and optionally fluxes into the bath through lances that extend downwardly and inwardly through side walls of the vessel so that the carrier gas and the solid material penetrate the metal layer and cause molten material to be projected from the bath.

This form of the HIsmelt process is an improvement over earlier forms of the process which form the transition zone by bottom injection of carrier gas and solid carbonaceous material through tuyeres into the bath which causes droplets and splashes and streams of molten material to be projected from the bath.

The applicant has carried out extensive pilot plant work on operating the HIsmelt process with continuous discharge of molten iron and periodic tapping of molten slag from the direct smelting vessel and has made a series of significant findings in relation to the process.

One of the findings, which is the subject of the present invention, is that the pressure in the direct smelting vessel is an effective means of controlling the level of molten metal in the vessel. This finding is applicable particularly although by no means exclusively to direct smelting processes which discharge molten metal continuously and tap molten slag periodically.

In general terms, the present invention is a direct smelting process for producing molten iron and/or ferroalloys from a metalliferous feed material which includes the steps of:

(a) forming a molten bath having a metal layer and a slag layer on the metal layer in a direct smelting vessel;

(b) supplying metalliferous feed material, carbonaceous material and fluxes into the vessel;

(c) smelting metalliferous feed material to molten iron in the molten bath;

(d) injecting an oxygen-containing gas into the vessel to post-combust gases generated in the process;

(e) continuously tapping molten metal from the vessel;

(f) periodically tapping molten slag from the vessel;

and which is characterised by controlling the level of molten metal in the vessel by adjusting the pressure in the vessel.

Preferably the process includes controlling the level of molten metal in the vessel by the steps of:

(i) increasing the pressure in the vessel at any time during a slag tap and up to 15 minutes after completing the slag tap to a pre-determined pressure P1 to compensate for an increase in metal height as a consequence of tapping slag from the vessel; and (ii) after the vessel pressure reaches pressure P1, adjusting the pressure so that the pressure is a lower pressure P2 at the next slag tap to compensate for the effect of increasing slag inventory on metal height during this period.

Preferably the pressure increase in step (i) is at least 5 kPa.

Preferably step (i) includes increasing the pressure in the vessel at any time during the slap tap and up to 10 minutes after completing the slag tap.

Preferably step (i) includes increasing the pressure in the vessel only during the period of the slag tap.

The pressure may be increased in step (i) in a series of steps or continuously.

Preferably step (i) includes increasing the pressure in the vessel in a series of steps.

The pressure adjustment step (ii) may include decreasing the pressure in a series of steps or continuously.

Preferably adjustment step (ii) includes decreasing the pressure in a series of steps.

Preferably the time interval between pressure reduction steps is 20–30 minutes.

It is noted that within the above-described framework of decreasing pressure from pressure P1 to pressure P2 there may be short term perturbations during which there are one or more pressure changes against the established trend of reducing pressure to pressure P2. For example, in a situation where the vessel includes a forehearth for tapping molten metal, there may be a need between slag taps to reduce the vessel pressure to a pressure below P2 for a short period of time to allow the metal level in the vessel to increase sufficiently so that the metal level in the forehearth decreases below that of the forehearth outlet and thereby enables safe changeover of launders and torpedo cars. After changeover is completed the pressure can be increased as required.

The pressure adjustment step (ii) may include adjusting the pressure to the lower pressure P2 over the whole of the period of time to the next slag tap. Alternatively, the pressure adjustment step may be completed a period of time before the next slag tap and the pressure held at the lower pressure P2 until the next tap.

The tap to tap period will vary depending on the range of factors, such as the size of the vessel and the injection rates and composition of feed materials.

Typically the period of time between slag taps is 2–3 hours.

Preferably the pressure increase steps and the pressure decrease steps in steps (i) and (ii) are 0.5–2 kPa.

More preferably the pressure increase steps and the pressure decrease steps in steps (i) and (ii) are 0.5–1.5 kPa.

Preferably step (b) includes injecting metalliferous feed material, solid carbonaceous material, and fluxes into the metal layer via a plurality of lances/tuyeres.

More preferably the solid carbonaceous material is coal.

Preferably step (c) includes smelting the metalliferous feed material to molten metal in the metal layer.

Preferably the direct smelting process includes causing molten material to be projected as splashes, droplets, and streams into a space above a normal quiescent surface of the molten bath and forming a transition zone.

More preferably the process includes injecting the oxygen-containing gas into the direct smelting vessel via one or more than one lance/tuyere and post-combusting reaction gases released from the molten bath, whereby the ascending and thereafter descending splashes, droplets, and streams of molten material in the transition zone facilitate heat transfer to the molten bath, and whereby the transition zone minimises heat loss from the vessel via a side wall of the vessel that is in contact with the transition zone.

The term "quiescent surface" in the context of the molten bath is understood to mean the surface of the molten bath under process conditions in which there is no gas/solids injection and therefore no bath agitation.

Preferably the oxygen-containing gas is air or oxygen-enriched air.

More preferably the oxygen-enriched air contains less than 50% by volume oxygen.

Preferably the process operates at high post-combustion levels.

Preferably the post-combustion levels are greater than 60%.

The metalliferous feed material may be any suitable iron-containing feed material. The preferred feed material is iron ore.

The iron ore may be pre-heated.

The iron ore may be partially reduced.

BRIEF DESCRIPTION OF THE DRAWINGS

The present invention is described further by way of example with reference to the accompanying drawings of which.

Figure 1:
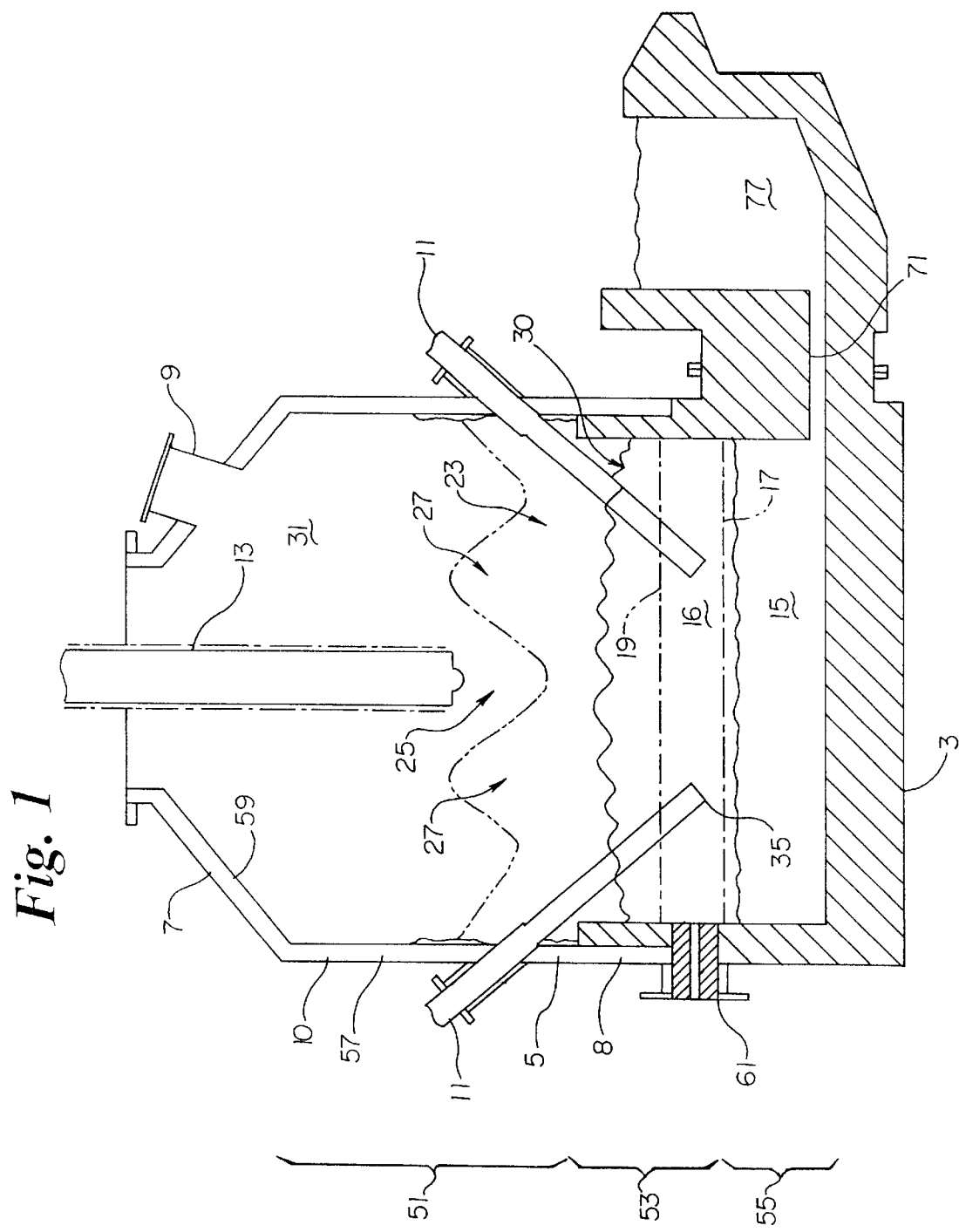
FIG. 1 is a vertical section through a preferred form of a direct smelting vessel for carrying out a process for direct smelting iron ore to molten iron in accordance with the present invention.

The vessel shown in FIG. 1 has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 77 which can discharge molten iron continuously; a forehearth connection 71 that interconnects the hearth and the forehearth 77; and a tap-hole 61 for discharging molten slag.

In use, under steady-state process conditions, the vessel contains a molten bath of iron and slag which includes a layer 15 of molten iron and a layer 16 of molten slag on the metal layer 15. The arrow marked by the numeral 17 indicates the position of the nominal quiescent surface of the iron layer 15 and the arrow marked by the numeral 19 indicates the position of nominal quiescent surface of the slag layer 16. The term "quiescent surface" is understood to mean the surface when there is no injection of gas and solids into the vessel.

The vessel also includes 2 solids injection lances/tuyeres 11 extending downwardly and inwardly at an angle of 30–60° to the vertical through the side walls 5 and into the slag layer 16. The position of the lances/tuyeres 11 is selected so that the outlet ends 35 are above the quiescent surface 17 of the iron layer 15 under steady-state process conditions.

In use, under steady-state process conditions iron ore, solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the iron layer 15. The coal is devolatilised and thereby produces gas in the iron layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the iron layer 15 as a consequence of solid/gas/injection) from the iron layer 15 which generates an upward movement of splashes, droplets and streams of molten material, and these splashes, and droplets, and streams entrain slag as they move through the slag layer 16.

The buoyancy uplift of molten metal, solid carbon and slag causes substantial agitation in the iron layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of the order of 30° in each region.

In addition, the upward movement of splashes, droplets and streams of molten metal and slag caused by the buoyancy uplift of molten metal, solid carbon, and slag extends into the top space 31 above the molten material in the vessel and:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel further includes a lance 13 for injecting an oxygen-containing gas (typically pre-heated oxygen enriched air) which is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, under steady-state process conditions, the injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the iron layer 15 when the metal/slag returns to the iron layer 15.

The free space 25 is important to achieving high levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, under steady-state process conditions, the ascending and descending droplets, splashes and streams of molten material is an effective means of transferring heat from the transition zone 23 to the molten bath with the result that the temperature of the transition zone 23 in the region of the side walls 5 is of the order of 1450° C.–1550° C.

The vessel is constructed with reference to the levels of the iron layer 15, the slag layer 16, and the transition zone 23 in the vessel when the process is operating under steady-state process conditions and with reference to splashes, droplets and streams of molten material that are projected into the top space 31 above the transition zone 23 when the process is operating under steady-state operating conditions, so that:

(a) the hearth and the lower barrel section 53 of the side walls 5 that contact the metal/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 57, 59.

Each water cooled panel 8, 57, 59 (not shown) in the upper barrel section 51 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent straight sections of each pipe and between the pipes. Each panel further includes a support plate which forms an outer surface of the panel.

The water inlets and the water outlets of the pipes are connected to a water supply circuit (not shown) which circulates water at high flow rate through the pipes.

The pilot plant work referred to above was carried out as a series of extended campaigns by the applicant at its pilot plant at Kwinana, Western Australia.

The pilot plant work was carried out with the vessel shown in FIG. 1 and described above and in accordance with the steady-state process conditions described above. In particular, the process operated with continuous discharge of molten iron via the forehearth 77 and periodic tapping of molten slag via the tap-hole 61.

The pilot plant work evaluated the vessel and investigated the process under a wide range of different:

(a) feed materials;
(b) solids and gas injection rates;
(c) slag inventories—measured in terms of the depth of the slag layer and the slag:metal ratios;
(d) operating temperatures; and
(e) apparatus set-ups.

In the context of the present invention it was found in the pilot plant work that it is important to control the level of molten iron in the vessel. If the iron level is too close to the forehearth connection 71 then the metal seal can be broken, with slag and gas entering the forehearth 77 with undesirable consequences. In addition, if the iron level is too high then there is a risk of submerging the solids injection lances/tuyeres 11 with undesirable consequences.

The level of iron in the vessel is a function of a number of factors, and one factor is the depth of the slag layer 16 on the iron layer 15, ie the slag inventory.

Specifically, as the slag inventory increases the iron is pushed down by the added weight on the iron layer 15. As the slag inventory decreases the level of the iron layer 15 rises. Accordingly, operating the process in the pilot plant with periodic tapping of slag and continuous discharge of molten iron means that there will be significant variations in the slag inventory over the tap-tap period, with significant variations in the level of molten iron in the vessel.

The applicant found in the pilot plant work that adjusting the pressure in the vessel is an effective means of compensating for variations in the slag inventory and of controlling the level of molten iron in the vessel to be within an acceptable height range over a tap-tap period.

Figure 2:
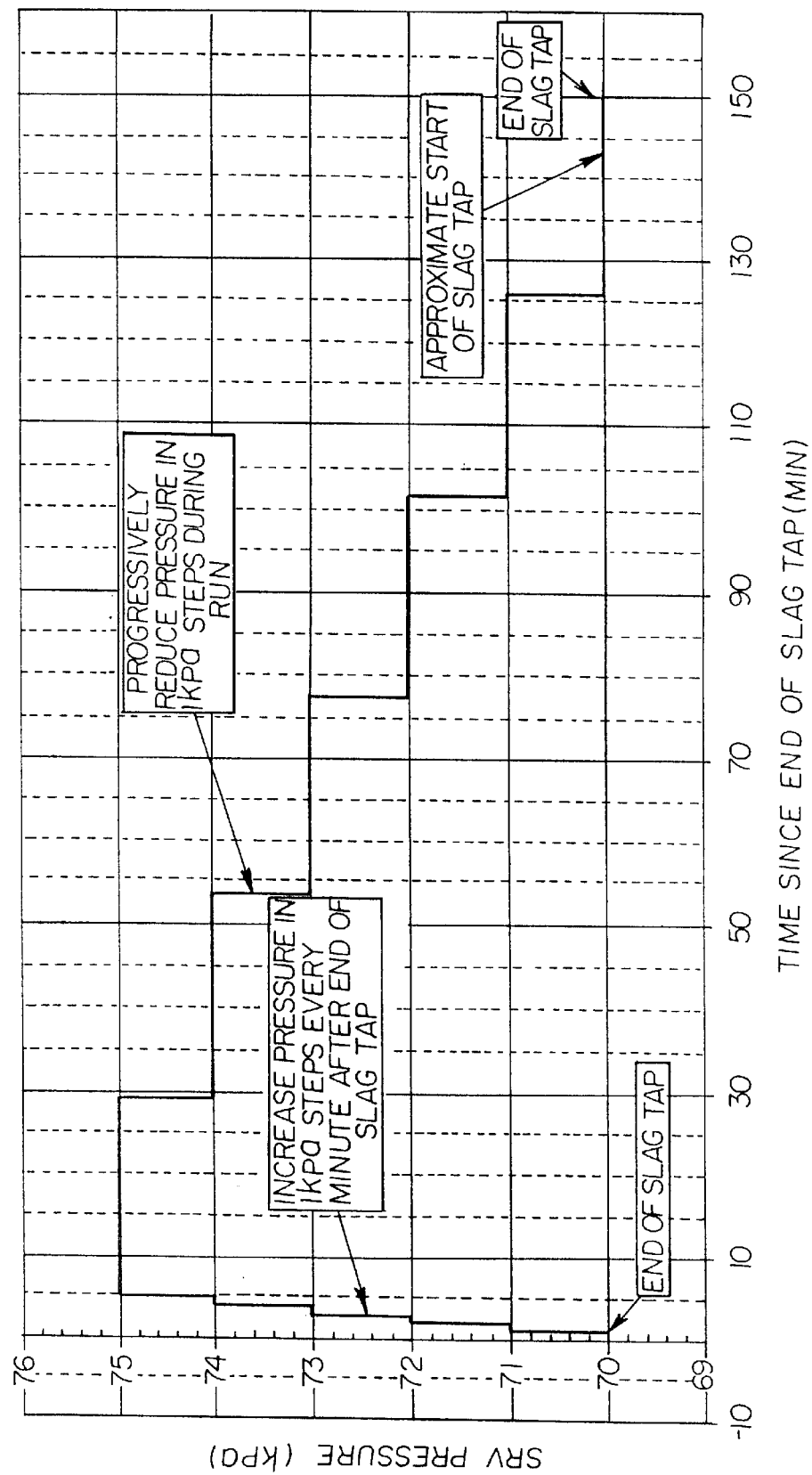
FIG. 2 is a graph of vessel pressure versus time for one preferred embodiment of the process.

In particular, the applicant found that adjusting the pressure in the vessel in accordance with the profile shown in FIG. 2 enabled effective control of the molten iron level in the vessel.

FIG. 2 is a pressure-time profile for a tap-tap period of 2½ hours. It can readily be appreciated that the general form of the profile is applicable to any tap-tap period.

With reference to FIG. 2, immediately after the completion of a slag tap, the vessel pressure is increased from 70 kPa at 1 kPa/minute to 75 kPa. This relatively large increase in vessel pressure in a relatively short period of time compensates for the increase in the iron level resulting from tapping slag from the vessel. The increase in pressure is achieved by adjusting control valves (not shown) of the off-gas discharge duct 9.

As a general proposition it is desirable to increase the pressure as quickly as possible from the tap pressure to the target pressure within the constraints of the vessel. One such constraint is that there could be a surge of molten metal through and from the forehearth 77 if the pressure is increased too quickly.

With further reference to FIG. 2, after reaching the target pressure of 75 kPa, the pressure is reduced to 70 kPa in a series of 1 kPa steps each over a 25 minute time period. The reduction in pressure over this period compensates for the reduction in iron level caused by the build-up of slag in the vessel during this period.

Figure 3:
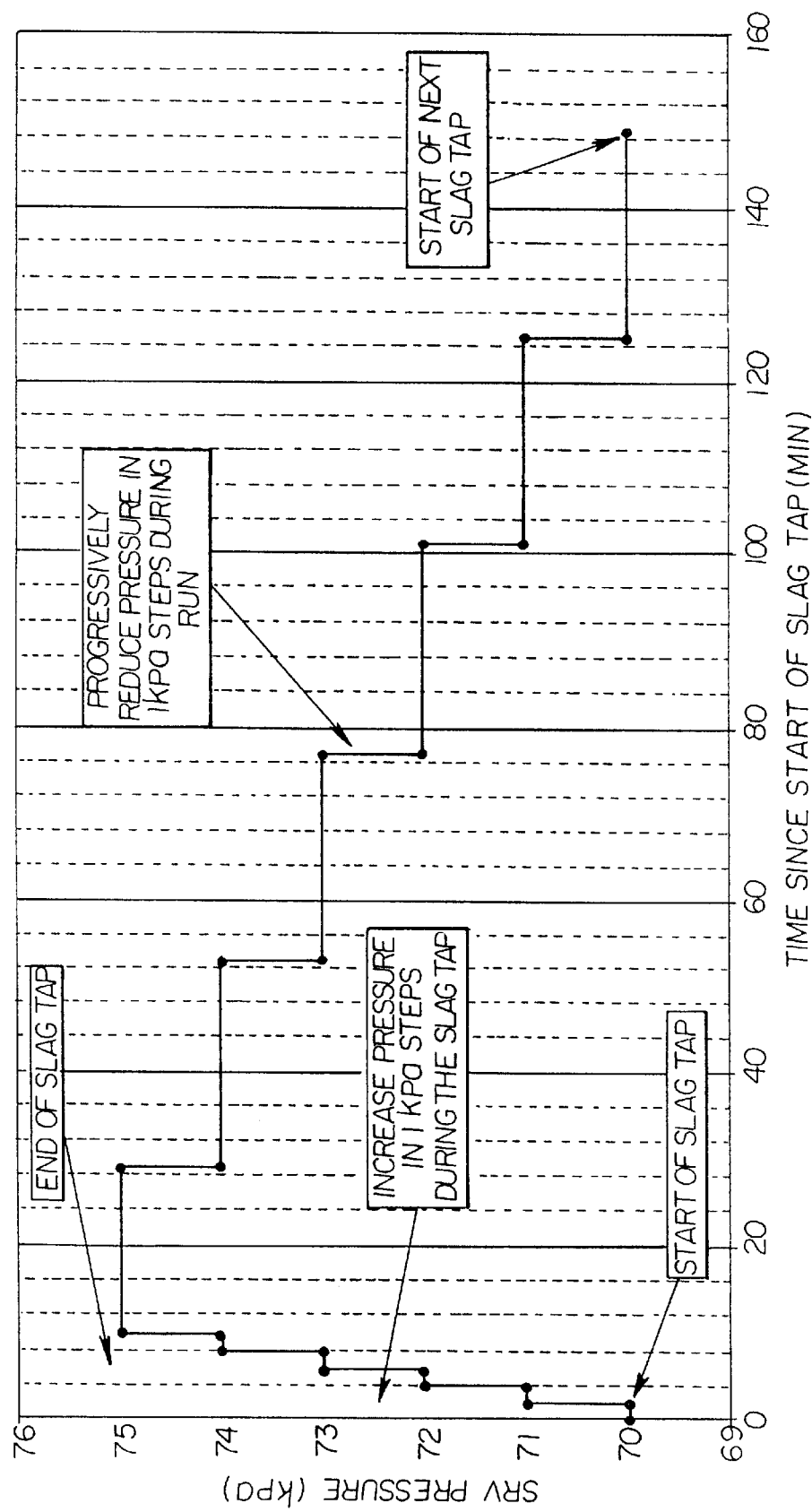
FIG. 3 is a graph of vessel pressure versus time for another preferred embodiment of the process.

FIG. 3 illustrates another, although not the only other, option for adjusting the pressure in the vessel in order to compensate for variations in the slag inventory and to control the level of molten iron in the vessel over a tap-tap period.

FIG. 3 is a pressure-time profile for a tap-tap period of 2½ hours.

In accordance with the pressure adjustment option illustrated in FIG. 3 the pressure is increased in a series of 1 kPa steps from 70 to 75 kPa during the course of the 10 minute period of a slag tap. This relatively large increase in vessel pressure in a relatively short period of time compensates for the increase in iron level resulting from tapping slag from the vessel. As with the pressure adjustment option illustrated in FIG. 2, the pressure increase is achieved by adjusting control valves of the off-gas discharge duct 9.

Many modifications may be made to the preferred embodiment of the process of the present invention as described above without departing from the spirit and scope of the present invention.

What is claimed is:

1. A direct smelting process for producing molten iron and/or ferroalloys from a metalliferrous feed material comprising the steps of:
   - (a) forming a molten bath having a metal layer and a slag layer on the metal layer in a direct smelting vessel;
   - (b) supplying metalliferrous feed material, carbonaceous material and fluxes into the vessel;
   - (c) smelting metalliferrous feed material to molten iron in the molten bath wherein gases are generated during steps (b) and (c);
   - (d) injecting an oxygen-containing gas into the vessel to post-combust the generated gases;
   - (e) continuously tapping molten metal from the vessel;
   - (f) periodically tapping molten slag from the vessel; and
   - (g) controlling the level of molten metal in the vessel by the steps of:
     - (2) increasing the pressure in the vessel at any time during a slag tap and up to 15 minutes after completing the slag tap to a pre-determined pressure P1 to compensate for an increase in metal height as a consequence of tapping slag from the vessel;
     - (ii) after the vessel pressure reaches pressure P1, adjusting the pressure to a pressure P2, at the next slag tap to compensate for the effect of increasing slag inventory on metal height during this period, where P1>P2.

2. The process defined in claim 1 wherein the pressure increase in step (i) is at least 5 kPa.

3. The process defined in claim 1 wherein step (i) includes increasing the pressure in the vessel at any time during the slag tap and up to 10 minutes after completing the slag tap.

4. The process defined in claim 1 wherein step (i) includes increasing the pressure in the vessel only during the period of the slag tap.

5. The process defined in claim 1 wherein step (i) includes increasing the pressure continuously.

6. The process defined in claim 1 wherein step (i) includes increasing the pressure in a series of steps.

7. The process defined in claim 6 wherein the pressure increase steps are 0.5–2 kPa.

8. The process defined in claim 7 wherein the pressure increase steps are 0.5 to 1.5 kPa.

9. The process defined in claim 1 wherein step (ii) includes decreasing the pressure continuously.

10. The process defined in claim 1 wherein step (ii) includes decreasing the pressure in a series of steps.

11. The process defined in claim 10 wherein the pressure decrease steps are 0.5–2 kPa.

12. The process defined in claim 11 wherein the pressure decrease steps are 0.5–1.5 kPa.

13. The process defined in claim 10 wherein the time interval between pressure reduction steps is 20–30 minutes.

14. The process defined in claim 1 wherein step (ii) includes adjusting the pressure to the lower pressure P2 over the whole of the period of time to the next slag tap.

15. The process defined in claim 1 wherein step (ii) is completed a period of time before the next slag tap and the pressure is held at the lower pressure P2 until the next tap.

16. The process defined in claim 1 wherein the period of time between slag taps is 2–3 hours.

17. The process defined in claim 1 wherein step (b) includes injecting metalliferrous feed material, solid carbonaceous material, and fluxes into the metal layer via a plurality of lances/tuyeres.

18. The process defined in claim 1 wherein step (c) includes smelting the metalliferous feed material to molten metal in the metal layer.

19. The process defined claim 1 includes causing molten material to be projected as splashes, droplets, and streams into a space above a normal quiescent surface of the molten bath and forming a transition zone.

20. The process defined in claim 19 includes injecting the oxygen-containing gas into the direct smelting vessel via one or more than one lance/tuyere and post-combusting reaction gases released from the molten bath, whereby the ascending and thereafter descending splashes, droplets, and streams of molten material in the transition zone facilitate heat transfer to the molten bath, and whereby the transition zone minimizes heat loss from the vessel via a side wall of the vessel that is in contact with the transition zone.

21. The process defined in claim 20 wherein the oxygen-containing gas is air or oxygen-enriched air.

* * * * *